United States Patent [19]
Hartmann et al.

[11] Patent Number: 6,036,071
[45] Date of Patent: Mar. 14, 2000

[54] BRACKET FOR ATTACHMENT OF A VEHICLE ACCESSORY TO A VEHICLE STRUCTURE

[75] Inventors: Jerome Hartmann, Carlisle; Thomas R. Steinhagen, West Des Moines, both of Iowa

[73] Assignee: Cobbs Manufacturing Company, Des Moines, Iowa

[21] Appl. No.: 09/305,882

[22] Filed: May 5, 1999

Related U.S. Application Data

[63] Continuation of application No. 08/963,006, Nov. 3, 1997, abandoned.

[51] Int. Cl.[7] .................................................. B60R 11/00
[52] U.S. Cl. ...................... 224/547; 224/482; 224/483; 224/553; 224/555; 248/292.12
[58] Field of Search ................... 224/547, 482, 224/483, 282, 545, 271, 272, 484, 549, 553; 248/292.12

[56] References Cited

U.S. PATENT DOCUMENTS

| | | |
|---|---|---|
| 2,157,001 | 5/1939 | Morley . |
| 2,690,212 | 9/1954 | Jakeway . |
| 3,717,253 | 2/1973 | Lovitz . |
| 4,047,687 | 9/1977 | Turner . |
| 4,248,340 | 2/1981 | Hild . |
| 4,324,379 | 4/1982 | Ovitz, III . |
| 4,352,478 | 10/1982 | Loew . |
| 4,372,517 | 2/1983 | Welch et al. . |
| 4,536,904 | 8/1985 | Whitehead . |
| 4,697,780 | 10/1987 | Wenkman et al. . |
| 4,749,112 | 6/1988 | Harper . |
| 4,767,012 | 8/1988 | Simmons . |
| 4,903,928 | 2/1990 | Shell . |
| 4,930,696 | 6/1990 | VanAcker . |
| 4,971,281 | 11/1990 | Steinbeck . |
| 4,984,722 | 1/1991 | Moore . |
| 5,022,621 | 6/1991 | Quest . |
| 5,230,492 | 7/1993 | Zwart et al. . |
| 5,274,885 | 1/1994 | Hellweg . |
| 5,407,158 | 4/1995 | Baird . |
| 5,414,770 | 5/1995 | Wang . |
| 5,428,502 | 6/1995 | Tsai . |
| 5,457,745 | 10/1995 | Wang . |
| 5,460,345 | 10/1995 | Trevaskis . |
| 5,538,213 | 7/1996 | Brown . |
| 5,556,068 | 9/1996 | Gorelik . |
| 5,588,631 | 12/1996 | Yee . |
| 5,608,603 | 3/1997 | Su . |
| 5,740,995 | 4/1998 | Richter . |

*Primary Examiner*—Gregory M. Vidovich
*Assistant Examiner*—Maerena W. Brevard
*Attorney, Agent, or Firm*—Dick and Harris

[57] ABSTRACT

An attachment apparatus for attaching a vehicle accessory to a vehicle structure including a first bracket member, a second bracket member and an interfacing member for interfacing the first bracket with the second bracket. The first bracket member includes a base member having an opening extending therethrough, and a member for attachment to a vehicle structure. The second bracket includes a carriage member having at least one post member extending outwardly therefrom, and a member for attachment to a vehicle accessory. The interfacing member interfaces the post member with the opening of the first bracket, to, in turn, maintain at least a portion of the first bracket and at least a portion of the second bracket member in overlying abutment.

19 Claims, 2 Drawing Sheets

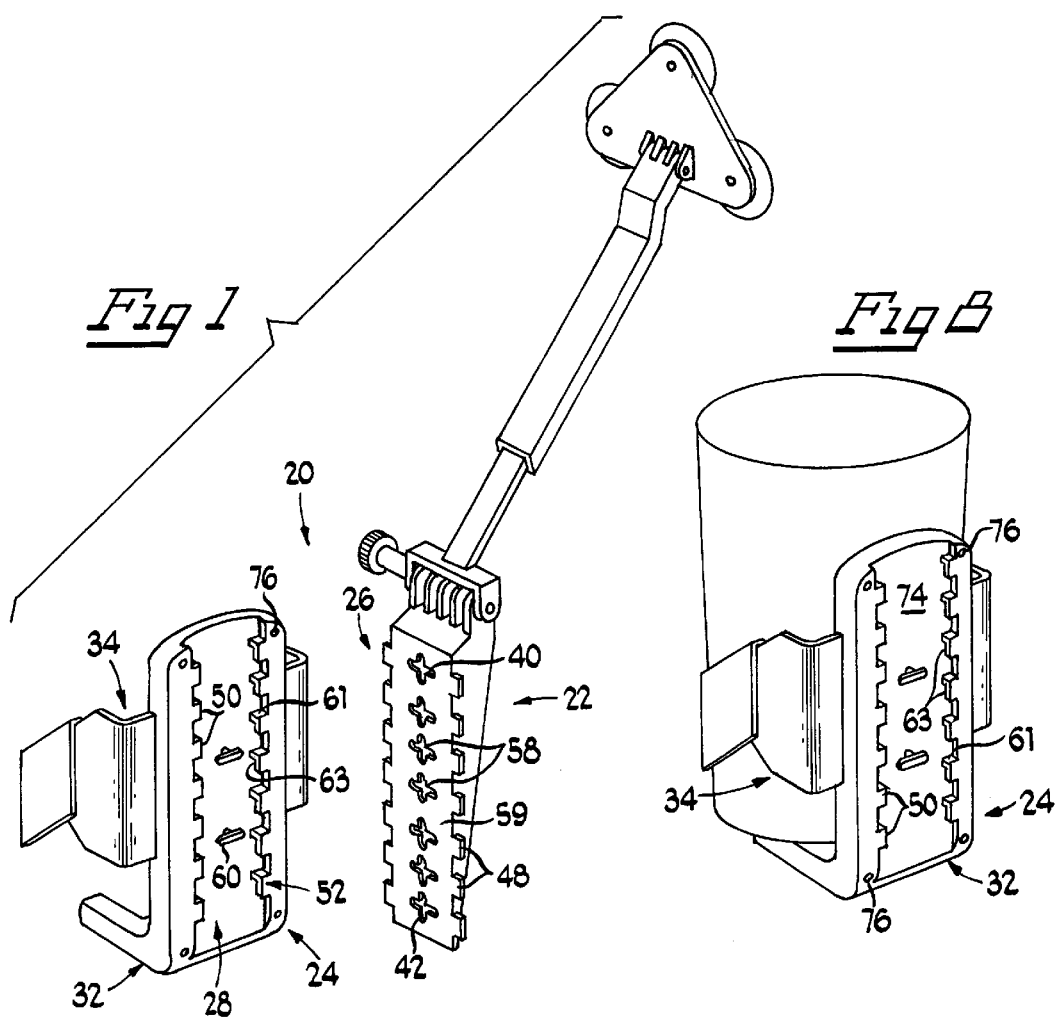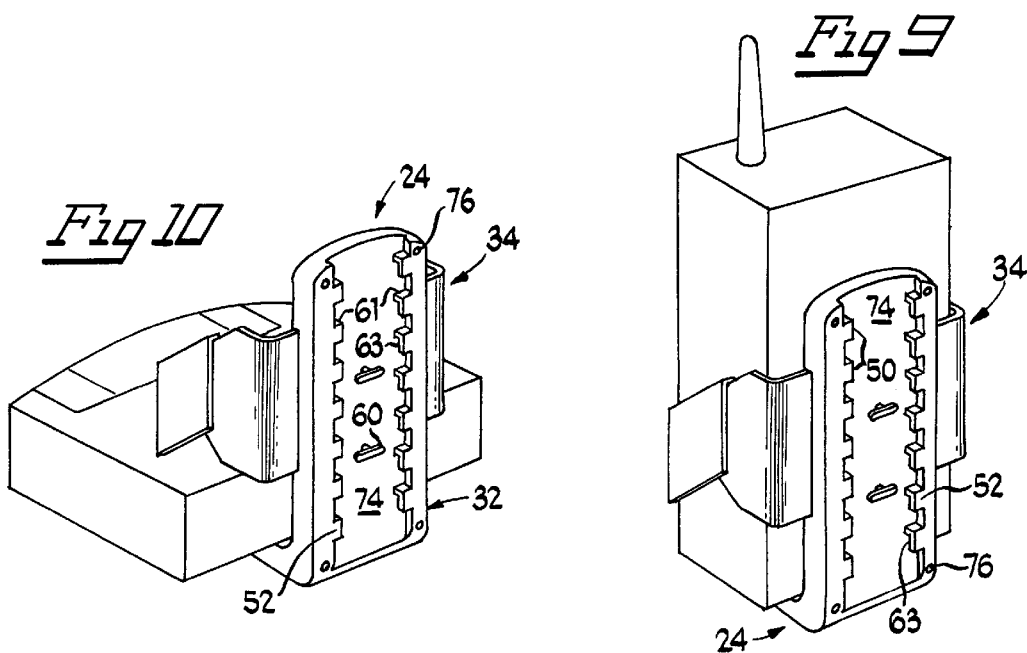

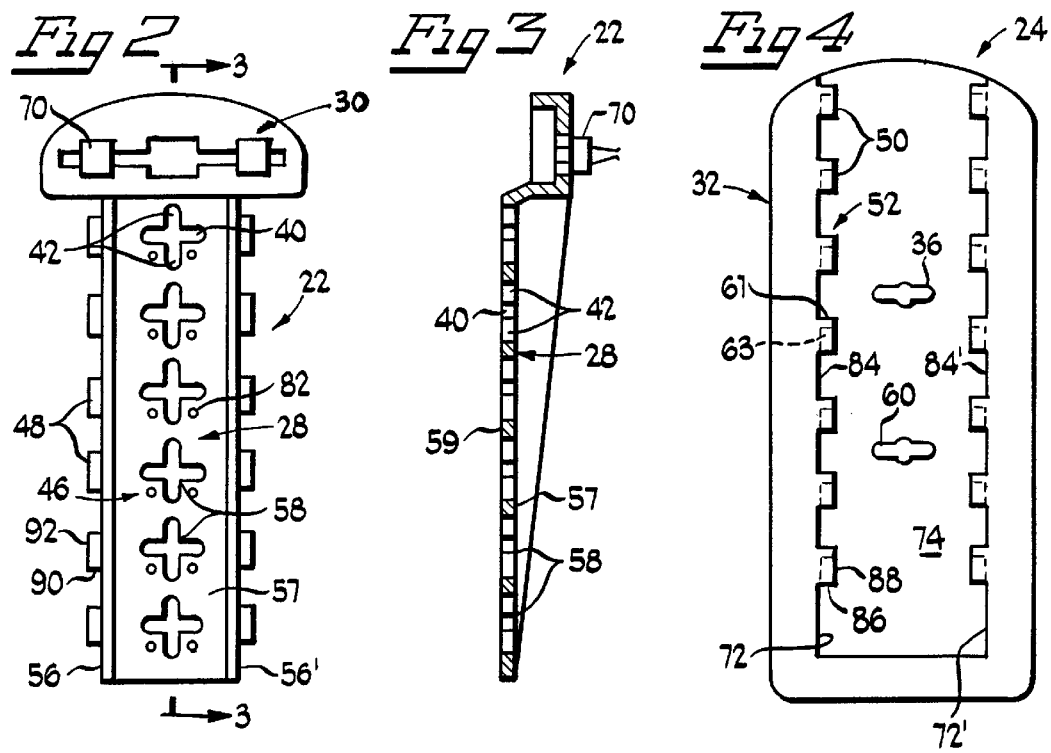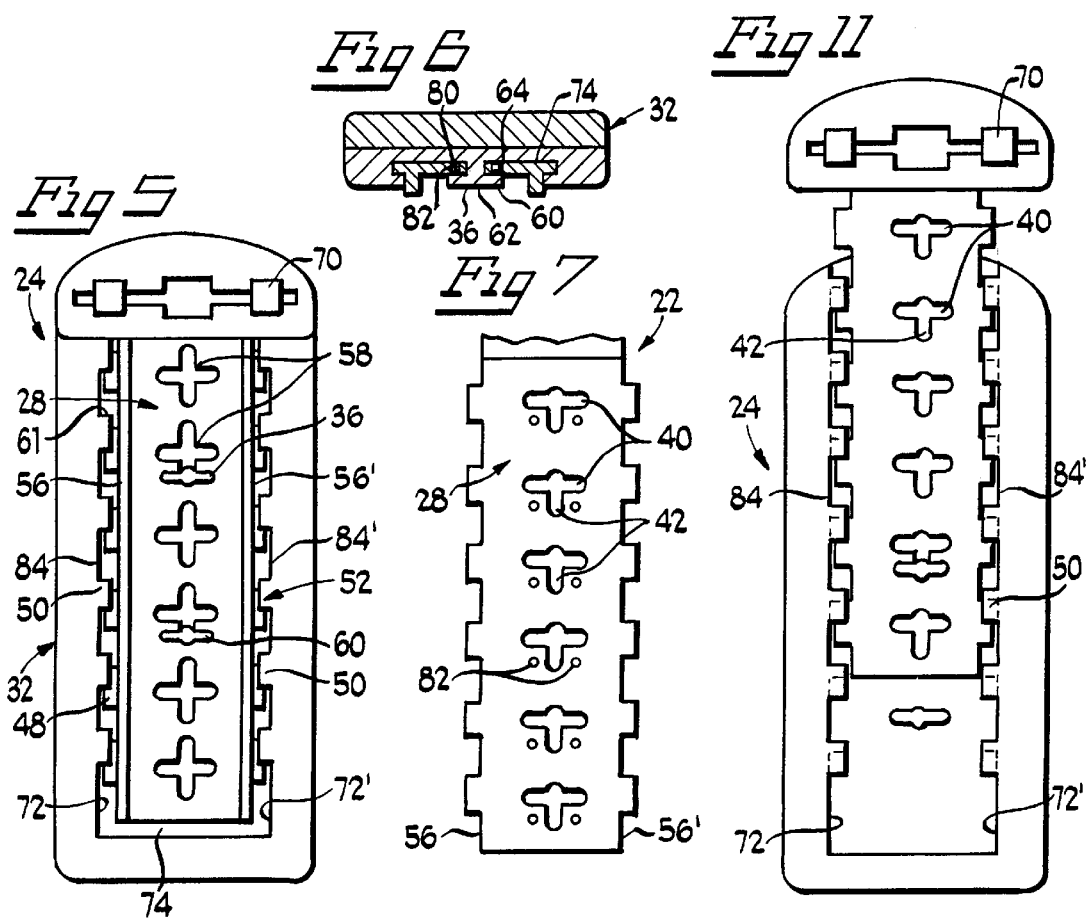

BRACKET FOR ATTACHMENT OF A VEHICLE ACCESSORY TO A VEHICLE STRUCTURE

BACKGROUND OF THE INVENTION

The present application is a continuation of Ser. No. 08/963,006, filed Nov. 3, 1997, now abandoned.

FIELD OF THE INVENTION

The invention relates in general to brackets, and more specifically to a bracket for attachment of a vehicle accessory to a vehicle structure.

BACKGROUND ART

The use of accessories such as cupholders, notepads, radar detectors, cellular telephone holders, pager holders, and other article holders in vehicles, as well as elsewhere in the home and office, has become increasingly popular. For example, the use of such structures in automobiles or boats, in particular has become more popular both due to the greater time people spend in their vehicles, as well as due to the increasing number of different accessories that have become indispensable. Today's vehicles, however, are increasingly limited with respect to their ability to properly hold these accessories. Indeed, many smaller cars lack the space and or the storage areas for retaining these accessories properly.

As such, a vast number of aftermarket structures have been developed to add storage space or mountings onto an existing vehicle. One such development has been the attachment of a holding device, such as a cupholder, to a vehicle permanently. One drawback of such a mounting is that the cupholder has become a permanent fixture in the vehicle. As such, should the user now require a notepad holder instead of a cupholder, the notepad holder must be positioned around the cupholder. With each additional accessory, placement around other existing vehicle accessories becomes difficult.

Further developments have led to removable attachment structures that permit temporary attachment of a vehicle structure. In such situations, the accessory may be attached through fasteners, clips or hook and loop type fasteners, among others, which permit selective disengagement and removal of the accessories as desired. Certain limitations exist with these attachment structures as well. Often times the attachment structure is only compatible with a single accessory and as such, the user must nevertheless maintain a multitude of attachment structures. Additionally, these accessories are often limited inasmuch as they lack adjustability features which can facilitate the positioning or the orientation of the accessory in an optimal position for a given vehicle.

Certain other attachment structures are available which can be used for any given number of accessories. These attachment structures, while versatile, are often difficult to utilize and require special tools to fully effectuate. Still others do not provide a strong and dependable connection between the vehicle structure and the vehicle accessory.

SUMMARY OF THE INVENTION

The invention comprises an attachment apparatus for attaching a vehicle accessory to a vehicle structure comprising a first bracket member, a second bracket member and means for interfacing. The base member includes at least one opening extending therethrough and means for attaching the first bracket member to one of a vehicle accessory and a vehicle structure. The second bracket member includes a carriage member having at least one post member extending outwardly therefrom and second means for attaching the second bracket member to the other of a vehicle accessory and a vehicle structure. The interfacing means is associated with the base and the carriage members. The interfacing means interfaces the post member with the at least one opening of the first bracket, to in turn, maintain at least a portion of the first bracket and at least a portion of the second bracket member in overlying abutment.

In a preferred embodiment, the interfacing means comprises a shaped member positioned on the post member away from the carriage member, a first region and a second region and means for retaining the post member within the second region. The first region is associated with the at least one opening of the base member and is configured to permit passage of the shaped region therethrough to in turn position at least a portion of the base member into overlying abutment with at least a portion of the carriage member. The second region is associated with the at least one opening of the base member and is configured to permit passage of the post member and to prohibit passage of the shaped region therethrough. The second region is configured to permit slidable movement of the post member relative to the carriage member upon extension of the post member through the first region of the opening. This in turn positions the post member from the first region to the second region, upon extension of the shaped member through the first region of the opening. The retaining means retains the post member within the second region of the at least one opening, to, in turn, maintain the overlying abutment of the base member and the carriage member.

In such an embodiment, the shaped member comprises an elongated member having a lower surface substantially parallel to the carriage member. The shaped member is positioned at a distance away from the carriage member substantially equal to the thickness of the region of the base member positioned in overlying abutment with the carriage member.

Further, in such an embodiment, the second region is positioned on at least two opposing sides of the first region, thus permitting slidable movement of the base member relative to the carriage member in at least two directions.

In a preferred embodiment, the retaining means comprises a detent and a receptacle. The detent is disposed upon one of the shaped member and the base member. The receptacle is positioned upon the other of the shaped member and the base member. The detent is positioned to engage the receptacle upon proper positioning of the post member into the second region of the at least one opening.

In another preferred embodiment, the base member further includes at least two substantially similar openings positioned at predetermined intervals about the base member. In such an embodiment, the carriage member further includes at least two post members positioned at predetermined intervals corresponding to the at least two openings, to in turn simultaneously facilitate engagement of the at least two openings with the at least two post members. In such an embodiment the at least two post members and the at least two openings are positioned substantially linearly.

In yet another preferred embodiment, the carriage member further includes at least two substantially similar post members positioned at predetermined intervals. In such an embodiment, the post members are positioned substantially collinearly.

In another preferred embodiment, the quantity of openings of the base member exceeds the quantity of post members of the carriage member.

Preferably, the interfacing means further comprises side protrusion members, wall regions extending from the carriage member, complementary extension members and means for maintaining the overlying abutment of the base and the carriage members. The wall regions extend from the carriage member and are spaced apart from each other a distance substantially equal to the width of the base member including the protrusion members. The complementary extension members extend inward from at least one of the wall regions. The extension members are spaced a distance away from the carriage member substantially equal to the thickness of the protrusion members. The positioning of the post member through the first region of the at least one opening positions the protrusion members in complement to the extension members, to, in turn, allow the protrusion members to extend beyond the extension members to allow overlying abutment of the base and carriage members. The maintaining means maintains the overlying abutment of at least a portion of the base member and the carriage member.

In such an embodiment, the maintaining means comprises the positioning of at least a portion of at least one of the protrusion members between the extension member and a potion of the carriage member, upon positioning the post member into the second region of the opening.

In yet another embodiment, the maintaining means comprises the positioning of at least a portion of the plurality of protrusion members into a containment region. In such an embodiment, the containment region includes a connector member extending transversely between at least one of the extension members and the base member to limit further slidable movement of the carriage member relative to the base member.

In a preferred embodiment, the first attachment means attaches the base member to a vehicle structure and the second attachment means attaches the carriage member to a vehicle accessory. In such an embodiment, the first attachment means comprises one of the group consisting of fasteners, suction cups, adhesive, clips and clamps. In another embodiment, the second attachment means comprises the integrated molding of the base member with the vehicle accessory. In such an embodiment, the second attachment means comprises one of the group consisting of fasteners, suction cups, adhesive, clips and clamps.

In another preferred embodiment, the vehicle structure may comprise a dashboard, floor, chair, seat, air vent, door panel, console and/or an appliance. The vehicle accessory may comprise a radar detector bracket, a cup holder, a notepad holder, a telephone holder, a compass holder and a clock holder.

BRIEF DESCRIPTION OF THE DRAWINGS

FIG. 1 of the drawings is a perspective view of the apparatus showing the first and second brackets engaged;

FIG. 2 of the drawings is a top plan view of the first bracket member;

FIG. 3 of the drawings is a cross-sectional view of the first bracket taken about lines 3—3 of FIG. 2;

FIG. 4 of the drawings is a top plan view of the second bracket member;

FIG. 5 of the drawings is a top plan view of the apparatus showing interfacing of the first and second brackets;

FIG. 6 of the drawings is a bottom view of the apparatus showing interfacing of the first and second brackets;

FIG. 7 of the drawings is a partial top plan view of a second embodiment of the first bracket member;

FIG. 8 of the drawings is a perspective view of the second bracket showing in particular the attachment to be a cupholder;

FIG. 9 of the drawings is a perspective view of the second bracket showing in particular the attachment to be a telephone holder;

FIG. 10 of the drawings is a perspective view of the second bracket showing in particular the attachment to be a notepad holder; and FIG. 11 of the drawings is a top plan view of the first bracket and the second bracket in an alternative overlying abutment.

DETAILED DESCRIPTION OF THE DRAWINGS

While this invention is susceptible of embodiment in many different forms, there is shown in the drawings and will herein be described in detail, one specific embodiment with the understanding the present disclosure can be considered as an exemplification of the principles of the invention and is not intended to limit the invention to the embodiment illustrated.

Attachment apparatus 20 is shown in FIG. 1 as comprising first bracket 22, second bracket 24 and means 26 for interfacing the first and second brackets. The attachment apparatus is contemplated for use in attaching a vehicle accessory to a vehicle structure. While use in vehicles, such as automobiles, boats and watercraft is contemplated, the attachment apparatus is not limited thereto. The attachment apparatus may likewise have a multitude of uses in other locations such as the home or office, among others. Additionally, the types of vehicle accessories include, without limitation, notepad holders, cupholders, radar detector brackets and other holders, such as telescoping arm holders, pager holders, to name a few. Of course, depending on the location of use, a vehicle, the home or the office, for example, differing accessories are certainly contemplated for use.

First bracket 22 is shown in FIGS. 2, 3 as comprising base member 28 and first means 30 for attachment to one of a vehicle accessory and a vehicle structure. Base member 28 includes side edges 56, 56', front panel 57 and openings such as opening 58. Side edges 56, 56', as will be explained, include side protrusion members 48. Front panel 57 of first bracket 22 comprises a substantially flat planar surface, although other surfaces are likewise contemplated for use. As will be explained, opening 58 includes a particular configuration, as dictated by the interfacing means, which facilitates attachment to the second bracket. As will be understood, openings 58 are positioned at desired intervals along the base member. While other configurations are contemplated, such as those having a single opening, where the base member includes multiple openings, the openings are generally linear and the intervals between the openings are equal. Preferably, the base member comprises a molded plastic member, however, other materials, such as metals, and other production methods such as forging are likewise contemplated.

First attachment means 30 is shown in FIGS. 2, 3, 5 as comprising a set of clip members 70. The clip members may be attached to a vehicle structure as desired. It is likewise contemplated that the first attachment means may comprise any one or more of the following structures: adhesive, clamps, clips, hook and loop fasteners, other fasteners, among others. Indeed, a multitude of releasable and permanent first attachment means are contemplated for use. Another first attachment means is shown in FIG. 1 comprising a clamp attached to a suction cup. Additionally, as will be explained below, it is likewise contemplated that the first attachment means may be attached to the vehicle accessory, and that the second attachment means may be attached to the vehicle structure.

Second bracket 24 is shown in FIGS. 4 and 5 as comprising carriage member 32, and second means 34 (FIGS. 1, 8–10) for attachment to one of a vehicle accessory and a vehicle structure. Carriage member 32 includes at least one post member, such as post member 60, side edges 72, 72', surface 74 and wall regions 84, 84'. Post members 60 may be spaced at intervals that correspond to a single (or multiple) intervals of openings 58 of base member 28. In other words, the distance between the posts may be equal to the distance between any two openings of the base member. Additionally, like the openings, the post members are generally linear. As will be understood, while the foregoing configuration of the post members is disclosed, any configuration of the post members and the openings that are capable of cooperating as explained below would be considered to be suitable for use.

Side edges 72, 72' extend about either side of surface 74. Surface 74 comprises a substantially flat, planar surface; however, other surfaces are likewise contemplated for use. Wall regions 84, 84' extend about either side edge 72, 72', respectively. The wall regions extend substantially vertically upward from surface 74 and are spaced apart a distance substantially equal to the width of base member 28. Of course, other configurations of the wall regions are likewise contemplated.

Second attachment means 34 is shown in FIGS. 1, 8–10 as comprising fasteners, such as fasteners 76. The fasteners 76 are attached to the vehicle accessory, as shown in FIGS. 1 and 8–10. Other attachment structures, such as adhesive, clamps, clips, hook and loop fasteners, other fasteners, among others are likewise contemplated for use. In a situation where first bracket is attached to a vehicle accessory, second bracket is attached either directly or indirectly to a vehicle structure. In other words, either the carriage member 32 of second bracket or the base member 28 of first bracket may be attached either directly or indirectly to either of the vehicle structure or the vehicle accessory.

The interfacing means is shown in FIGS. 2–6 as comprising shaped member 36, first region 40 (FIG. 2), second region 42 (FIG. 2), retaining means 46, side protrusion members 48, extension members 50, and means 52 for maintaining the protrusion members in operative engagement.

Shaped member 36 is shown in FIG. 6 as comprising an elongated member 62 which is positioned a distance away from the surface 74 of carriage member 32 on post member 60. Elongated member 62 includes lower surface 64. As will be explained, the distance between lower surface 64 of elongated member 62 and the carriage member is substantially equal to the thickness of the base member proximate opening 58.

First region 40 is shown in FIG. 2 as comprising a generally transverse region of opening 58. The first region is configured so that upon proper positioning of the base member with respect to the carriage member, the shaped member is positioned to extend through first region 40. As such, first region 40 is configured to permit the passage of shaped member 36 therethrough.

Second region 42 is shown in FIG. 2 as comprising a region on either side of opening 58. As will be explained, the second region, on either side of the first region, is configured to permit positioning of post 60 therein, but to prohibit the passage of shaped member therethrough. As shown in FIG. 7, it is also contemplated that second region extends only on one side of the first region.

In other words, and as will be explained, shaped member is configured to extend through first region 40 of the interfacing means, and to be prevented from extending through second region 42. As such, the particular shape of each section is not crucial, rather, the relationship between the regions and each of the post member and the shaped member is important. The first region must permit passage of the shaped member therethrough, and, upon sliding of the base relative to the carriage (to position the post member into the second region), the elongated member is prohibited from passing back through this second region. Thus, and as will be explained, the base and the carriage are maintained in overlying engagement.

Retaining means 46 is shown in FIGS. 2 and 6 as comprising detent 80 and receptacle 82. Detent 80 is positioned on lower surface 64 of elongated member 62. Receptacle 82 is positioned on back panel 59 of base member 28 proximate second region 42 of opening 58. As will be explained below with respect to the operation of the bracket, when the first bracket and the second bracket are in overlying engagement and post member 60 is positioned in second region 42 of the opening, detent 80 engages receptacle 82 to retain the apparatus in this configuration. An increased force is required to overcome the engagement of the detent and the receptacle. The force required is in excess of the forces that may generally be experienced in the environment in which the apparatus is used. For example, the force required is generally greater than the force that can be imparted by bumps or vibrations in a vehicle.

Side protrusion members, such as side protrusion member 48, are shown in FIGS. 2 and 5 as extending from either side edges 56 of base member 28. The side protrusion members include width 90 and length 92, and each of the side protrusion members are generally identical and are positioned at regular intervals along the side edges. Moreover, the side protrusions about the side edges are symmetrical about the base member. Of course, other configurations of the side protrusions, including side protrusions of varying shapes as well as varying quantities of side protrusions, are likewise contemplated. Additionally, it is likewise contemplated that only one of the side edges include protrusion members.

Extension members 50 are shown in FIGS. 4–6 as extending inward from each of the wall regions, substantially parallel to and spaced a predetermined distance away from surface 74 of carriage member 32. Each of the extension members 50 includes width 86 and length 88. Width 86 is substantially equal to or less than the width of the protrusion members. Length 88 of the extension members is substantially equal to or less than the longitudinal distance between any pair of neighboring side protrusion members. Similarly, the distance between any two extension members is substantially equal to or less than length 92 of the side protrusion member.

As will be understood, with such a configuration, the extension members and the side protrusion members are substantially complementary, and the members appear to be staggered so that when properly positioned, the protrusion members can extend into the space between the extension members and the extension members can extend into the space between the protrusion members. Additionally, as will also be understood, when positioned in the described staggered orientation, the side protrusion members may be moved beyond the extension members so as to position the base member into abutment with the carriage member.

It will be understood that the interfacing means may utilize only the cooperation between the extension members and the protrusion members, or only the cooperation of the post member and shaped member with the first and second regions, or both structures.

Maintaining means 52 is shown in FIGS. 1, 4 and 5 as comprising connector members, such as connector member 61 which defines containment region 63. As will be explained with respect to the operation of the apparatus, as the base member and the carriage member are positioned into abutment, the protrusion members extend beyond the extension members and into abutment with surface 74. At such time, as the post member is positioned into second region 42 of opening 58, the protrusion member is positioned into containment region 63. In other words, at such time, at least a portion of the extension member is in overlying engagement with the protrusion member, thereby preventing the protrusion member from extending back through the space between the extension members which would in turn detach the base member from the carriage member.

In operation, for example, where a user is desirous of attaching a cellular telephone holder to a vehicle structure, such as a dashboard, the attachment apparatus is quite useful. As shown in FIG. I and FIG. 5, the base member is brought into position relative to the carriage member. Specifically front panel 57 of base member 28 is positioned to overly surface 74 of base member 32. Next, the base member and/or the carriage member are manipulated until a desired shaped member overlies a desired opening 58. Alternatively, a desired protrusion member may be positioned between two desired extension members.

As will be understood, due to the symmetrical nature of the apparatus and due to the positioning of the extension members, the protrusion members, the openings and the post members, many configurations are possible. Indeed, as shown in FIG. 5 and FIG. 11, a desired post member may be aligned with any number of different openings of the base member. Likewise, a protrusion member may be aligned between any of the extension members as desired. This is advantageous inasmuch as it offers added versatility to the apparatus by facilitating a multitude of different attachment configurations.

Moreover, where the second region includes a region on either side of the first region (wherein the opening resembles a cross), the base member may be positioned in a first orientation, as shown in FIG. 5, or in a second orientation wherein the base member is rotated 180° about an axis perpendicular to front panel 57 of the base member.

Once a single opening is aligned with a shaped member, or once a single protrusion member is aligned between two extension members, the remaining openings are automatically aligned with the appropriate opening and the remaining protrusion members are aligned with the appropriate extension members. Upon full alignment, front panel 57 of base member 28 is positioned into overlying abutment with surface 74 of carriage member 32.

Once the two surfaces abut, the base member is slid relative to the carriage member so that, as shown in FIG. 5, the post members currently positioned within first regions of the corresponding openings will be forced into the second regions thereof. At the same time, the protrusion members engage corresponding maintaining means 52. Specifically, each protrusion member that passed between two extension members enters respective containment region 63.

Lastly, as post member is accepted into second region 42, retaining means serves to maintain this configuration. Specifically, and as explained, detents 80 engage corresponding receptacles 82, to maintain the post members in the respective second regions of the respective openings, and to likewise maintain the protrusion members within the desired containment region.

Once engaged, the first bracket may be attached, via the first attaching means, to a vehicle structure. Likewise, the second bracket may be attached via the second attaching means to a vehicle accessory. Of course, it is likewise contemplated that the first bracket may be attached to the vehicle structure, and the second bracket may be attached to the vehicle accessory prior to the engagement of the first and second brackets.

To disconnect the first bracket from the second bracket, a user merely slides the base member relative to the carriage member to overcome retaining means 46. Once the retaining means is overcome, the base member is slid relative to the carriage member until the post member is positioned in the first region. The proper positioning can further be facilitated by maintaining means 52. Specifically, as protrusion member exits from within the containment region, the lower edge thereof abuts connector 61 of the adjoining containment region. Upon such abutment, not only is the protrusion member properly positioned for removal between extension members, but the post member is positioned squarely within first region 40.

Once properly positioned, the base member is lifted away from the carriage member until the protrusion members extend back beyond the extension members, and until the shaped member extends beyond first region 40 of the corresponding opening. Accordingly, the first and second brackets are now separated.

It will be understood that the first bracket may be attached to the vehicle structure permanently. The user may, through the use of the second bracket, attach a multitude of different accessories, as required, to this same bracket. Specifically, the user can attach a cupholder first, then detach the cupholder, and instead attach a notepad or a cellular telephone holder.

The foregoing description and drawings merely explain and illustrate the invention and the invention is not limited thereto, as those skilled in the art who have the disclosure before them will be able to make modifications and variations therein without departing from the scope of the invention.

What is claimed is:

1. An apparatus for attaching a vehicle accessory to a vehicle structure comprising:
    a first bracket member, attachable to one of a vehicle accessory and a vehicle structure, including a base member having at least two side edges, a width and at least one opening extending therethrough;
    side protrusion members extending outward from at least one side edge of the base member, the side protrusion members having a thickness and being spaced at predetermined intervals;
    a second bracket member, attachable to the other of the vehicle accessory and the vehicle structure, including a carriage member having at least one integral post member extending outwardly therefrom;
    wall regions extending from the carriage member, the wall regions spaced apart from each other a distance substantially equal to the width of the base member which includes the protrusion members;

a shaped member positioned on the post member away from the carriage member;

a first region associated with the at least one opening of the base member configured to permit passage of the shaped member and the post member therethrough to, in turn, position at least a portion of the base member into overlying abutment with at least a portion of the carriage member;

a second region associated with the at least one opening of the base member and configured to permit passage of the post member and to prohibit passage of the shaped member therethrough, the second region configured to permit slidable movement of the post member relative to the carriage member upon extension of the post member through the first region of the opening to, in turn, position the post member from the first region to the second region, after extension of the shaped member through the first region of the opening;

the at least one post member interfacing the second region of the at least one opening of the first bracket to, in turn, releasably secure the first bracket member to the second bracket member by maintaining at least a portion of the first bracket member and at least a portion of the second bracket member in overlying abutment;

extension members extending inward from at least one of the wall regions of the carriage member, the extension members being spaced a distance away from the carriage member substantially equal to the thickness of the protrusion members, wherein positioning of the post member through the first region of the at least one opening positions the protrusion members in complement to the extension members to, in turn, allow the protrusion members to extend beyond the extension members, thus further facilitating overlying abutment of at least a portion of the base member with at least a portion of the carriage member.

2. The attachment apparatus according to claim 1 wherein the shaped member has a lower surface substantially parallel to the carriage member, the shaped member being positioned at a distance away from the carriage member substantially equal to the thickness of the portion of the base member positioned in overlying abutment with the carriage member.

3. The attachment apparatus according to claim 1 wherein the second region is positioned on at least two opposing sides of the first region, to permit slidable movement of the base member relative to the carriage member in at least two directions.

4. The attachment apparatus according to claim 3 wherein the base member has a first orientation when the post member is positioned in the portion of the second region on one side of the first region, and a second orientation distinct from the first orientation when the post member is positioned in the portion of the second region on an opposing second side of the first region.

5. The attachment apparatus according to claim 3 further comprising:

a detent disposed upon one of the shaped member and the base member;

a receptacle positioned upon the other of the shaped member and the base member, the detent positioned to engage the receptacle upon proper positioning of the post member into the second region of the at least one opening of the base member.

6. The attachment apparatus according to claim 3 wherein the quantity of openings of the base member exceeds the quantity of post members of the carriage member.

7. The attachment apparatus according to claim 3 wherein the positioning of at least a portion of at least one of the plurality of protrusion members between an extension member and a portion of the carriage member, upon positioning of the post member into the second region of the opening, securably maintains the abutment of at least a portion of the base member to the carriage member.

8. The attachment apparatus according to claim 1 wherein the base member further includes at least two substantially similar openings positioned at predetermined intervals about the base member.

9. The attachment apparatus according to claim 8 wherein the carriage member further includes at least two post members positioned at predetermined intervals corresponding to the at least two openings, to in turn simultaneously facilitate engagement of the at least two openings with the at least two post members.

10. The attachment apparatus according to claim 9 wherein the at least two post members, and the at least two openings are positioned substantially linearly with respect to each other.

11. The attachment apparatus according to claim 1 wherein the carriage member further includes at least two substantially similar post members positioned at predetermined intervals.

12. The attachment apparatus according to claim 11 wherein the post members are positioned substantially collinearly.

13. The attachment apparatus according to claim 1 wherein the quantity of openings of the base member exceeds the quantity of post members of the carriage member.

14. The attachment apparatus according to claim 1 wherein the positioning of at least portion of at least one of the plurality of protrusion members between an extension member and a portion of the carriage member, upon positioning of the post member into the second region of the opening, securably maintains the abutment of at least a portion of the base member to the carriage member.

15. The attachment apparatus according to claim 1 wherein at least a portion of at least one of the plurality of protrusion members are positioned into a containment region including a connector member extending transversely between at least one of the extension members and the base member to limit further slidable movement of the carriage member relative to the base member.

16. The attachment apparatus according to claim 1 further comprising:

a detent disposed upon one of the shaped member and the base member;

a receptacle positioned upon the other of the shaped member and the base member, the detent positioned to engage the receptacle upon proper positioning of the post member into the second region of the at least one opening of the base member.

17. The attachment apparatus according to claim 1 wherein one of the bracket members is integrally molded with the vehicle accessory.

18. The attachment apparatus according to claim 1 wherein the vehicle structure comprises one of the group consisting of: dashboard, floors, chairs, seats, air vents, doors, consoles and appliances.

19. The attachment apparatus according to claim 1 wherein the vehicle accessory comprises one of the group consisting of: radar detector brackets, cup holders, notepad holders, telephone holders, compass holders and clock holders.

* * * * *

UNITED STATES PATENT AND TRADEMARK OFFICE
CERTIFICATE OF CORRECTION

PATENT NO : 6,036,071
DATED : March 14, 2000
INVENTOR(S): Jerome Hartmann and Thomas R. Steinhagen It is certified that error appears in the above-identified patent and that said Letters Patent are hereby corrected as shown below:

Column 4, Line 61            Delete "5" and insert --6--

Column 10, Line 33           Insert "a" between "least" and "portion"

Signed and Sealed this

Seventeenth Day of April, 2001

NICHOLAS P. GODICI

*Attest:*

*Attesting Officer*      *Acting Director of the United States Patent and Trademark Office*